US008653703B2

(12) United States Patent
Kori et al.

(10) Patent No.: US 8,653,703 B2
(45) Date of Patent: Feb. 18, 2014

(54) PERMANENT MAGNETIC ROTATING ELECTRIC MACHINE AND WIND POWER GENERATING SYSTEM

(75) Inventors: Daisuke Kori, Hitachinaka (JP); Shogo Serita, Hitachi (JP); Tetsuo Fujigaki, Hitachi (JP); Masaaki Endo, Hitachi (JP); Yoshihiro Yasui, Hitachi (JP); Ai Nagano, Hitachi (JP); Mamoru Kimura, Hitachi (JP); Motonobu Iizuka, Hitachi (JP); Akiyoshi Komura, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 303 days.

(21) Appl. No.: 13/029,287

(22) Filed: Feb. 17, 2011

(65) Prior Publication Data

US 2011/0241350 A1    Oct. 6, 2011

(30) Foreign Application Priority Data

Mar. 30, 2010    (JP) ................................. 2010-076566

(51) Int. Cl.
*H02K 9/18* (2006.01)
(52) U.S. Cl.
USPC .................................. 310/54; 310/57; 310/64
(58) Field of Classification Search
USPC ............. 310/54, 59, 60 A, 63, 64, 88, 57, 58; 290/44, 55
See application file for complete search history.

(56) References Cited

U.S. PATENT DOCUMENTS

| | | | |
|---|---|---|---|
| 3,597,645 A * | 8/1971 | Duffert et al. ................... | 310/14 |
| 3,784,851 A * | 1/1974 | Fujii ............................... | 310/58 |
| 5,925,947 A | 7/1999 | Kajiwara et al. | |
| 7,619,332 B2 | 11/2009 | Kimura et al. | |

(Continued)

FOREIGN PATENT DOCUMENTS

| | | |
|---|---|---|
| CN | 1159090 | 9/1997 |
| CN | 1756038 | 4/2006 |

(Continued)

OTHER PUBLICATIONS

English machine translation from JPO for JP 2001238395 A, Aug. 2001, Fujigaki et al.*

(Continued)

*Primary Examiner* — Tran Nguyen
*Assistant Examiner* — Naishadh Desai
(74) *Attorney, Agent, or Firm* — Antonelli, Terry, Stout & Kraus, LLP.

(57) ABSTRACT

The permanent magnet rotating electric machine comprising a stator with a stator coil wound on a stator iron core, a rotor with a plurality of permanent magnets disposed in the circumferential direction in a rotor iron core, which is disposed opposite to the stator iron core of the stator with a predetermined spacing therebetween and is fixed to a shaft, a water-cooling unit disposed around the outer circumference of the stator iron core, and a fan fixed to the shaft on the same side as at least one axial end of the rotor iron core to circulate cooling air in the permanent magnet rotating electric machine;

further comprising ventilation paths, through which the cooling air flows, formed around the outer circumference of the water-cooling unit;

wherein after the cooling air has been circulated by the fan in the machine for cooling, the cooling air is led to the ventilation paths to perform heat exchange between the cooling air flowing in the ventilation paths and the water-cooling unit, after which the cooling air is circulated again in the machine.

2 Claims, 14 Drawing Sheets

(56) References Cited

U.S. PATENT DOCUMENTS

| | | | |
|---|---|---|---|
| 7,994,666 B2 | 8/2011 | Kori et al. | |
| 2001/0042983 A1* | 11/2001 | Kinoshita | 290/44 |
| 2003/0020339 A1* | 1/2003 | Ide et al. | 310/58 |
| 2006/0071568 A1* | 4/2006 | Kimura et al. | 310/156.56 |

FOREIGN PATENT DOCUMENTS

| | | |
|---|---|---|
| CN | 201142605 | 10/2008 |
| JP | 09-285071 | 10/1997 |
| JP | 10-290551 | 10/1998 |
| JP | 2001-238395 | 8/2001 |
| JP | 2001238395 A * | 8/2001 |
| JP | 2005-39926 | 2/2005 |
| JP | 2005039926 A * | 2/2005 |
| JP | 2006-109549 | 4/2006 |
| JP | 2007-325436 | 12/2007 |
| JP | 2008-131813 | 6/2008 |
| JP | 2009-038864 | 2/2009 |

OTHER PUBLICATIONS

English machine translation from JPO for JP 2005039926 A, Feb. 2005, Hayashi et al.*

Official Action of SIPO in Application No. 2013022800864610, dated Mar. 5, 2013, English translation of this office action.

* cited by examiner

A > B

PERMANENT MAGNETIC ROTATING ELECTRIC MACHINE AND WIND POWER GENERATING SYSTEM

CLAIM OF PRIORITY

The present application claims priority from Japanese patent application serial No. 2010-076566, filed on Mar. 30, 2010, the content of which is hereby incorporated by reference into this application.

FIELD OF THE INVENTION

The present invention relates to a permanent magnet rotating electric machine and a wind power generating system, and more particularly to a permanent magnet rotating electric machine and a wind power generating system that are suitable to a permanent magnet power generator with a larger capacity of 1 MW or more.

BACKGROUND OF THE INVENTION

The use of electric power generated by wind has drastically increased in recent years. To improve economy by increasing the capacity of a single machine, there has been an increasing demand for permanent magnet rotating electric machines with a large capacity of 1 MW or more. When a large-capacity permanent magnet rotating electric machine is used, even if its efficiency is high, large loss is generated as an absolute value. To enable a large-capacity permanent magnet rotating electric machine to have a generated heat density equal to that of a small-capacity permanent magnet rotating electric machine, the body of the large-capacity permanent magnet rotating electric machine must be enlarged. When the body of the rotating electric machine is enlarged, however, its weight is increased and thereby manufacturing costs and construction costs are increased. Accordingly, it is necessary to increase the output density with a small body.

However, an increase in output density causes an increase in generated heat density, so high cooling performance is required. As a result, an increase in cost is brought. If a permanent magnet rotating electric machine has a structure that does not easily generate heat, merits (a reduced body and high efficiency) gained by the use of permanent magnets are lessened, impairing electric characteristics. Then, it becomes difficult to satisfy specifications for electric power generators. To achieve highly efficient cooling at a low cost without impairing electric characteristics, a structure suitable for cooling is a requisite.

Patent Documents 1 and 2 disclose cooling structures of rotating machines of this type that achieve highly efficient cooling at a low cost without impairing electric characteristics.

That is, Patent Document 1 discloses a structure in which a stator iron core has fins shaped like a star, in each of which a coolant flow path for cooling is formed. Patent Document 2 discloses a structure in which a heat-collecting jacket, in which a coolant flows around the outer circumference of a stator, is provided; and a heat dissipating jacket and a ventilation path are disposed outside the heat-collecting jacket.

PRIOR ART DOCUMENTS

Patent Document 1: Japanese Patent Laid-Open No. 2009-38864
Patent Document 2: Japanese Patent Laid-Open No Hei 9(1997)-285071

SUMMARY OF THE INVENTION

A wind power generator usually has a power generator structure including a rotor, a stator, and a heat exchanger used for cooling or a water-cooling unit. For a water-cooled power generator, heat generated by the power generator is cooled by a water-cooling unit in which cooling-water paths are formed. To reduce a temperature rise in the power generator, therefore, the body of the water-cooling unit itself must be enlarged. As a result, the body of the entire power generator and its weight are increased. For a permanent magnet power generator, heat is mainly generated by a stator coil, but when a water-cooling unit is disposed around the outer circumference of the stator, the coil temperature can be efficiently lowered. Accordingly, enlarging the body of a water-cooling unit is effective in lowering the temperature.

In Patent Document 1 described above, flow paths through which a coolant flows are formed in the iron stator. Since the stator iron is also used as a magnetic path through which a magnetic flux of a rotating magnetic field passes, the flow paths formed for a coolant flow increase magnetic resistance and lower the performance as a rotating machine. Furthermore, the flow paths, which are circumferentially and axially formed, are complex. When the motor is stopped for, for example, maintenance and the coolant is drained from the flow paths, some of the coolant may be left in the flow paths.

In Patent Document 2, both a water-cooling structure and an air-cooling structure are used. Noting an air-cooling unit, the air-cooling unit has a structure in which an external fan disposed outside the rotating machine causes cooling air to flow. Although the structure is effective in lowering the stator coil temperature, however, the interior (rotor and bearing) is not sufficiently cooled. To reduce the temperature in the interior, the generated heat density in the interior must be lowered, resulting in a necessity for a large rotating machine body.

The present invention addresses the above problems with the object of providing a permanent magnet rotating electric machine that can efficiently reduce a temperature rise in the rotating machine without enlarging a heat exchanger and water-cooling unit.

In a permanent magnet rotating electric machine according to the present invention that has a stator with a stator coil wound on a stator iron core, a rotor with a plurality of permanent magnets disposed in the circumferential direction in a rotor iron core, which is disposed opposite to the stator iron core of the stator with a predetermined spacing therebetween and is fixed to a shaft, a water-cooling unit disposed around the outer circumference of the stator iron core, and a fan fixed to the shaft on the same side as at least one axial end of the rotor iron core to circulate cooling air in the permanent magnet rotating electric machine, the present invention is characterized in that ventilation paths, through which the cooling air flows, are formed around the outer circumference of the water-cooling unit; after the cooling air has been circulated by the fan in the machine for cooling, the cooling air is led to the ventilation paths to perform heat exchange between the cooling air flowing in the ventilation paths and the water-cooling unit, after which the cooling air is circulated again in the machine.

The present invention can provide a permanent magnet rotating electric machine that can efficiently reduce a temperature rise in the rotating machine without enlarging a heat exchanger and water-cooling unit and thereby can improve the cooling efficiency.

DESCRIPTION OF THE PREFERRED EMBODIMENTS

Figure 1:
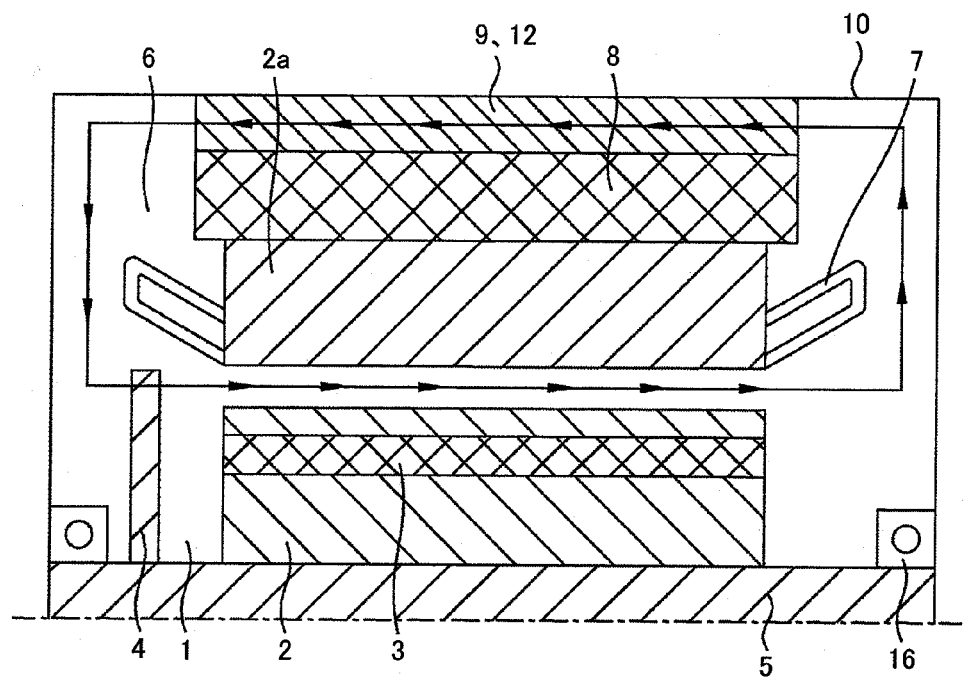
FIG. 1 is an axial cross sectional view showing a permanent magnet power generator that is a first embodiment of a permanent magnet rotating electric machine according to the present invention. (First embodiment)

Permanent magnet power generators, which are permanent magnet rotating electric machines according to the present invention, will be described below in detail, with reference to the drawings. In the drawings, like elements are denoted by like reference numerals.

First Embodiment

FIG. 1 shows a permanent magnet power generator that is a first embodiment of the present invention.

In FIG. 1, a rotor 1 has a rotor iron core 2, which is formed by laminating a plurality of electromagnetic steel plates in the axial direction; a plurality of permanent magnets 3 is embedded in the circumferential direction in the electromagnetic steel plates constituting the rotor iron core 2, and the rotor iron core 2 is fixed to a shaft 5. An axial fan 4, which circulates cooling air in the machine, is fixed to the shaft 5 at one end (on the left in FIG. 1) of the rotor iron core 2 in the axial direction. A stator 6, which is disposed facing the rotor 1 with a predetermined spacing therebetween, has a stator iron core 2a formed by laminating a plurality of electromagnetic steel plates in the axial direction; a stator coil 7 is provided in stator slots formed on the inner diameter side of the stator iron core 2a. A water-cooling unit 8, which is like a water-cooling jacket, is provided so as to come in contact with the outer circumferential surface of the stator 6. Ribs 9 for ventilation cooling are provided around the outer circumference of the water-cooling unit 8, at predetermined intervals in the circumferential direction. A power generator frame 10 is fixed around the outer circumference of the ribs 9 to seal the interior of the power generator. Reference numeral 16 indicates a bearing that rotatably supports the shaft 5.

Figure 2:
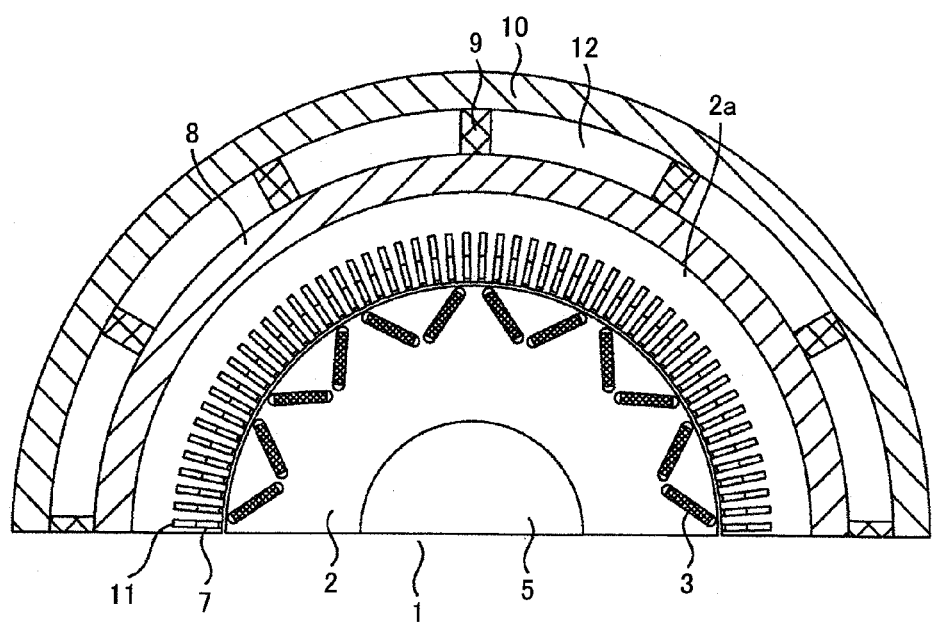
FIG. 2 is a radial cross sectional view of FIG. 1. (First embodiment)

FIG. 2 is a radial cross sectional view of FIG. 1. The permanent magnets 3 embedded in the rotor 1 as described above are disposed in the circumferential direction so as to form substantially "V" shapes while their polarities are alternately changed. The ribs 9 for ventilation cooling are disposed around the outer circumference of the water-cooling unit 8 at predetermined intervals in the circumferential direction; the circumferential intervals of the ribs 9 are enclosed with the power generator frame 10, which covers the entire power generator on the outer circumferential side of the ribs 9, to form ventilation paths 12.

The example shown in the drawing is a three-phase AC power generator in which the number of poles of the rotor 1 is 12 and the number of stator slots 11 is 108.

The flow of internal air will be described with reference to FIGS. 1 and 2. The axial fan 4 causes air in the power generator to flow in the axial direction between the rotor 1 and stator 6. When the cooling air reaches the end in the axial direction, the cooling air changes its direction to a radial direction and cools the end of the stator coil 7. Then, the cooling air is led into the ventilation paths 12 formed among the ribs 9 disposed around the outer circumference of the water-cooling unit 8 and circulates in the power generator. That is, the ribs 9 are equally spaced around the outer circumference of the water-cooling unit 8 in the circumferential direction as shown in FIG. 2; the cooling air circulates in the power generator while flowing in the ventilation paths 12 formed among the disposed ribs 9.

Accordingly, after the cooling air has been heated by being made to flow by the axial fan 4 in the axial direction between the rotor 1 and stator 6 and by cooling the end of the stator coil 7 and other parts, the cooling air is led to the ventilation paths 12, so heat exchange occurs between the water-cooling unit 8 and the heated cooling air flowing through the ventilation paths 12 and thereby the heated cooling air is cooled. The cooled cooling air is circulated again by the axial fan 4 in the power generator.

Figure 3:
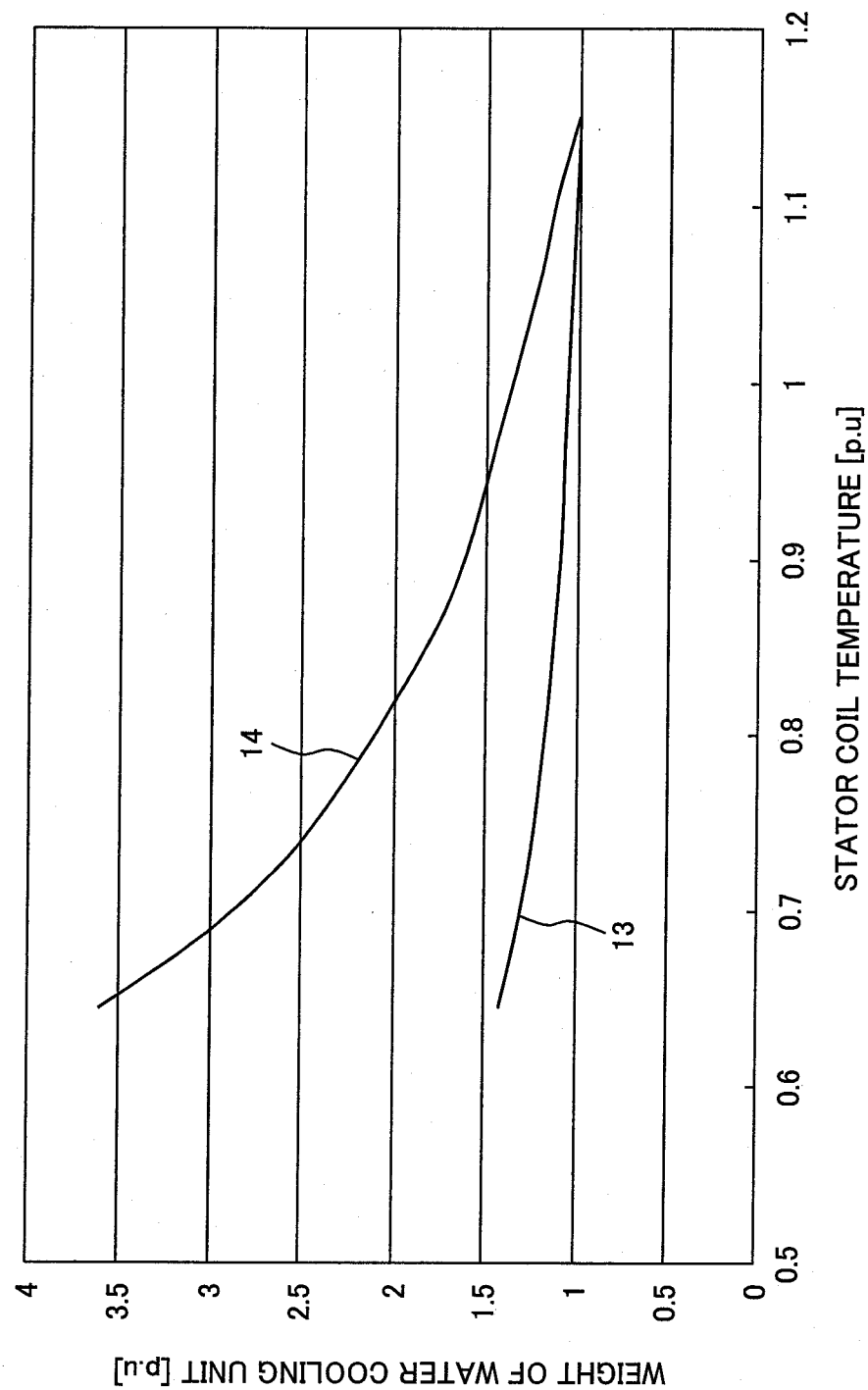
FIG. 3 is a characteristic graph that represents, in the first embodiment, a relationship between the temperature of a stator coil and the weight of a water-cooling unit. (First embodiment)

Next, a relationship between the temperature of the stator coil 7 and the weight of the water-cooling unit will be described with reference to FIG. 3. FIG. 3 shows the weight of the water-cooling unit 8 when the ribs 9 for ventilation cooling are disposed in the water-cooling unit 8 (the weight being denoted by reference numeral 13) as well as the weight of the water-cooling unit 8 when the ribs 9 for ventilation cooling are not disposed (the weight being denoted by reference numeral 14).

The temperature of the stator coil 7 is normalized by taking its upper temperature limit as 1, and the weight of the water-cooling unit 8 is similarly normalized by taking the weight of the water-cooling unit 8 without the ribs 9 as 1. Therefore, when the temperature of the stator coil 7 is 1 or below, the upper temperature limit is satisfied and the temperature is reduced; when the weight of the water-cooling unit 8 is 1 or more, the weight is increased.

It is found from the drawing that when the temperature of the stator coil 7 is reduced, the weight of the water-cooling unit 8 tends to inherently increase. Noting the weight of the water-cooling unit 8 without the ribs 9, which is denoted by reference numeral 14, it is found that as the temperature is lowered, the weight of the water-cooling unit 8 is greatly increased. Noting the weight of the water-cooling unit 8 with the ribs 9, which is denoted by reference numeral 13, an increase in the weight of the water-cooling unit 8 is gradual in comparison with reference numeral 14 without ribs 9. This indicates that as the number of ribs 9 is increased, the temperature can be lowered while an increase in the weight of the water-cooling unit 8 is suppressed.

Accordingly, when the water-cooling unit 8 is mounted, the ribs 9 are provided in the water-cooling unit 8, and air in the power generator is circulated by the axial fan 4, it becomes possible to lower the temperature of the stator coil 7 with the water-cooling unit 8. It is also possible to reduce the temperature due to heat exchange by the ribs 9 and to suppress the power generator weight.

As the structure of the cooling unit, the water-cooling unit 8, ribs 9, and power generator frame 10 are included as separate components in this embodiment. However, the water-cooling unit 8 and ribs 9 may be integrated together and the ribs 9 and power generator frame 10 may be integrated together.

In this embodiment, distributed winding is used as the method of winding the stator coil 7 around the stator 6, the number of poles is 12, and the number of stator slots 11 is 108. However, the same effect as in the example described above can be obtained from concentrated winding and another number of poles and slots. Although the permanent magnets 3 in the rotor 1 are flat-plate magnets and are disposed in V-shapes, it will be appreciated that other types of magnets may be disposed in another arrangement without any problem.

Second Embodiment

Figure 4:
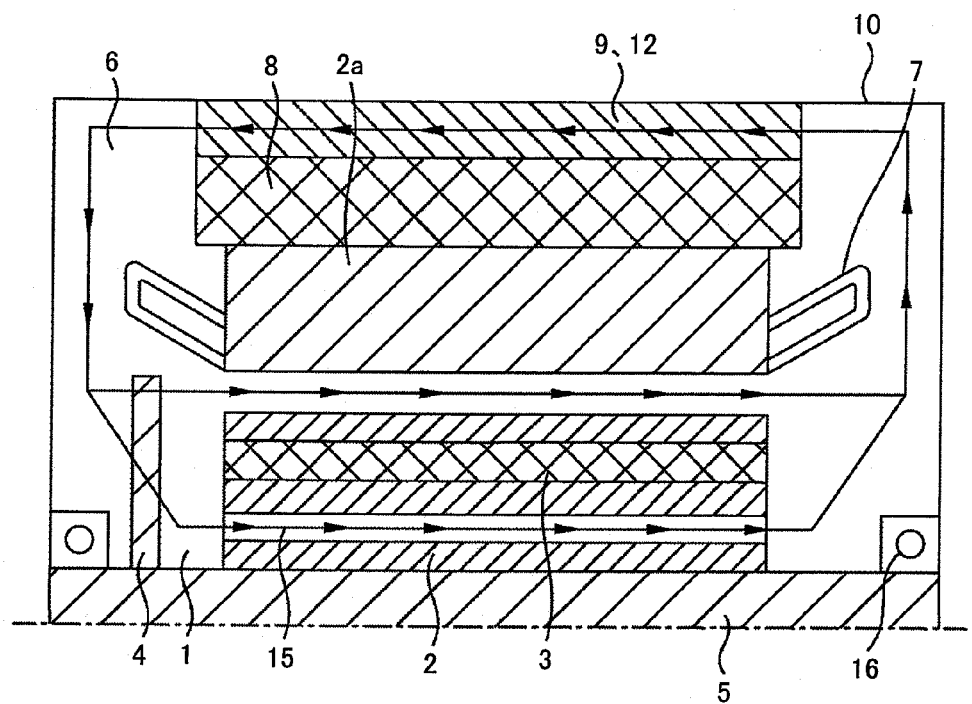
FIG. 4 is an axial cross sectional view showing a permanent magnet power generator that is a second embodiment of the permanent magnet rotating electric machine according to the present invention. (Second embodiment)
Figure 5:
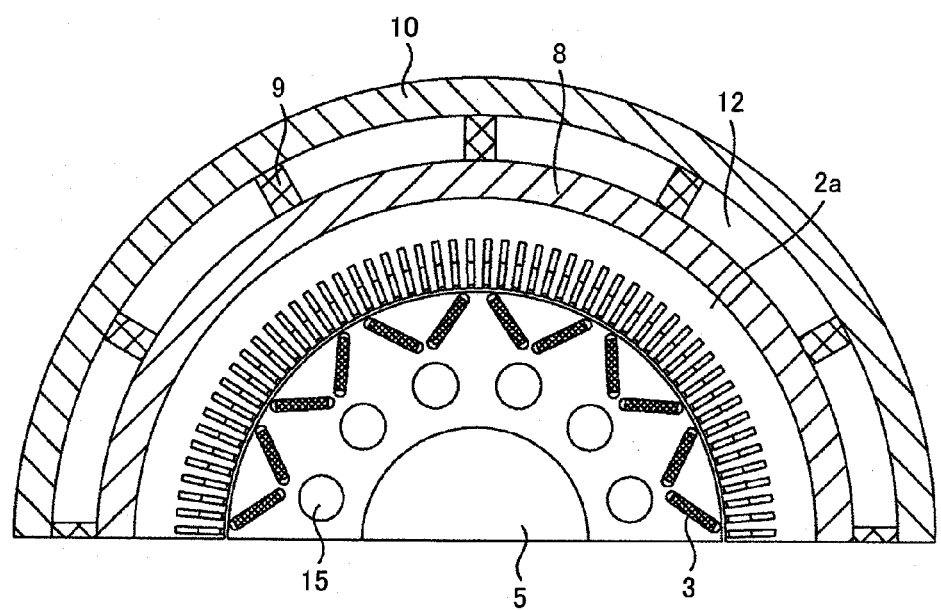
FIG. 5 is a radial cross sectional view of FIG. (Second embodiment)

FIGS. 4 and 5 show a permanent magnet power generator that is a second embodiment of the present invention.

In the second embodiment shown in FIGS. 4 and 5, a plurality of axial ducts 15 for ventilation in the axial direction is formed in the rotor iron core 2 in the circumferential direction at equal intervals, between the shaft 5 and the permanent magnet 3 in the rotor 1.

Accordingly, the axial fan 4 causes air in the power generator to flow between the rotor 1 and stator 6 and to flow in the axial ducts 15 in the axial direction, so ventilation resistance in the axial direction is reduced and the amount of air circulating in the interior can be increased. Since the bearing 16 is also exposed to the cooling air, the temperature of the bearing 16 can also be reduced.

Figure 6:
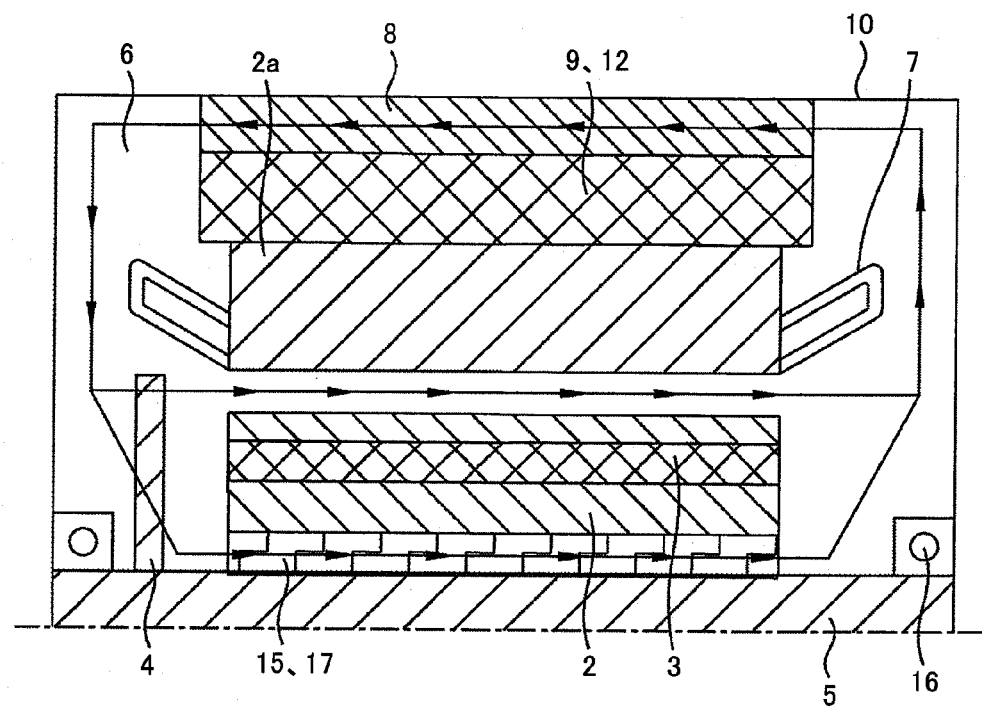
FIG. 6 is an axial cross sectional view showing another example of the permanent magnet power generator that is the second embodiment of the present invention. (Second embodiment)
Figure 7:
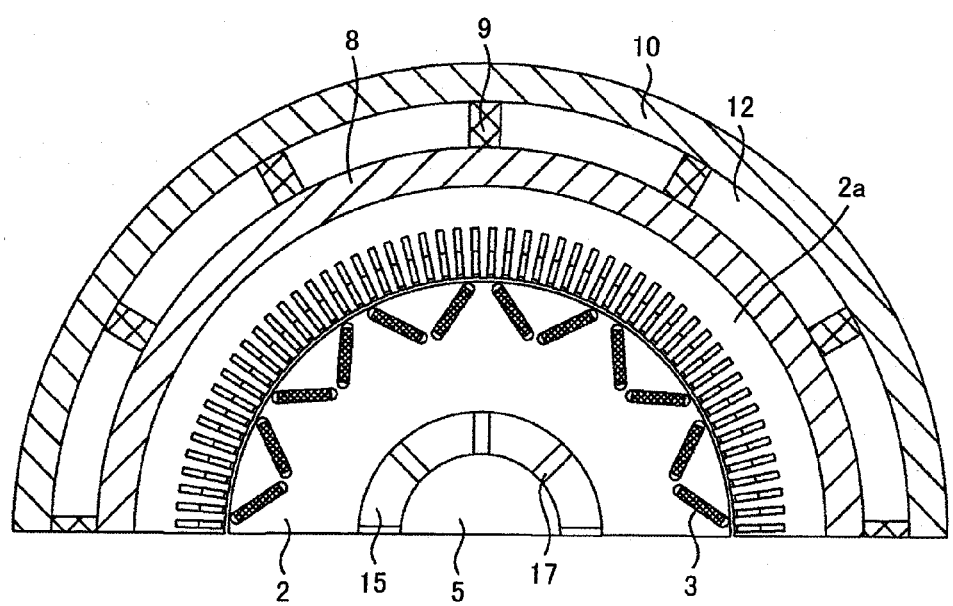
FIG. 7 is a radial cross sectional view of FIG. 6. (Second embodiment)

Another structure by which the same effect as in the second embodiment can be obtained is shown in FIGS. 6 and 7. As shown in FIGS. 6 and 7, a plurality of plates 17 extending in the axial direction is provided in the circumferential direction between the shaft 5 and rotor iron core 2, at equal intervals. The axial ducts 15 for ventilation in the axial direction are formed among the plates 17 disposed in the circumferential direction.

In this structure, not only the same effect as in the embodiment described above can be obtained, but also costs can be reduced and rotor stiffness can be assured.

Figure 8:
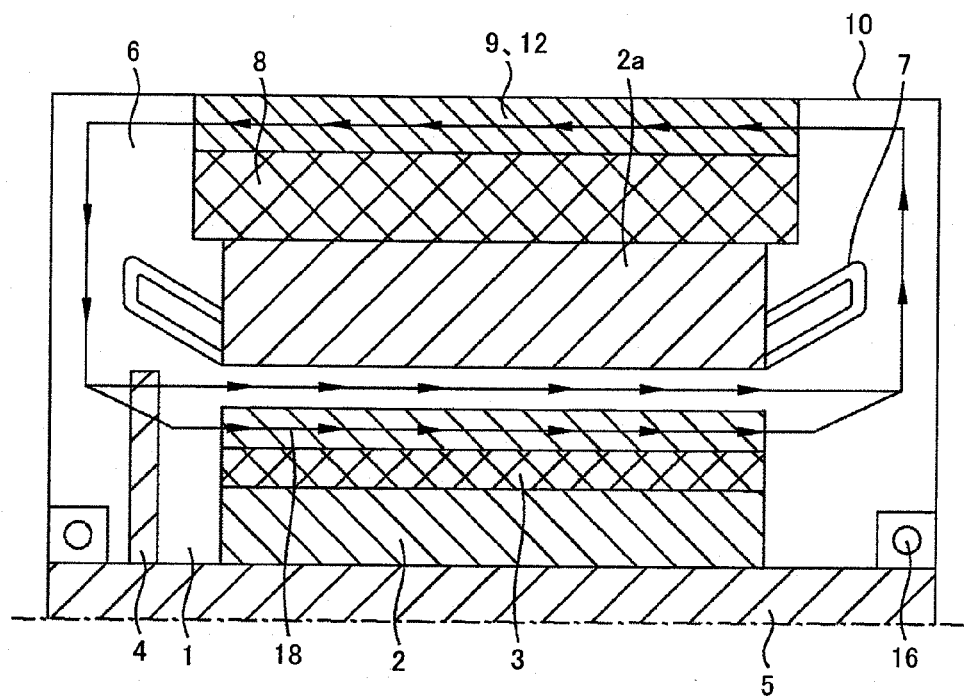
FIG. 8 is an axial cross sectional view showing yet another example of the permanent magnet power generator that is the second embodiment of the present invention. (Second embodiment)
Figure 9:
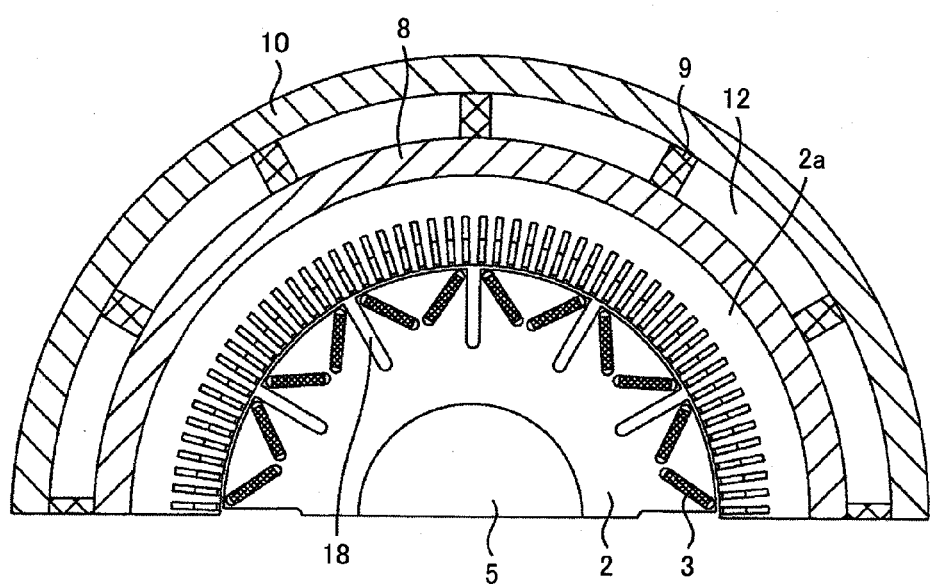
FIG. 9 is a radial cross sectional view of FIG. 8. (Second embodiment)

Another structure by which the same effect as in the first embodiment can be obtained is shown in FIGS. 8 and 9. As shown in FIGS. 8 and 9, the permanent magnets 3 are disposed in the circumferential direction in the rotor iron core 2 with their polarities alternately changed, and inter-pole ventilation paths 18 are formed by forming a groove between each two adjacent poles with different polarities, the groove extending in the axial direction and also extending in a radial direction from between the poles toward the center of the axis.

In this structure, not only the same effect as in the embodiment described above can be obtained, but also since the inter-pole ventilation paths 18 are disposed close to the permanent magnets 3, heat generated from the permanent magnets 3 can be lessened by ventilation cooling through the inter-pole ventilation paths 18.

Although the permanent magnets 3 in the rotor 1 are flat-plate magnets and are disposed in V-shapes in this embodiment, other types of magnets may be disposed in another arrangement without any problem.

Third Embodiment

Figure 10:
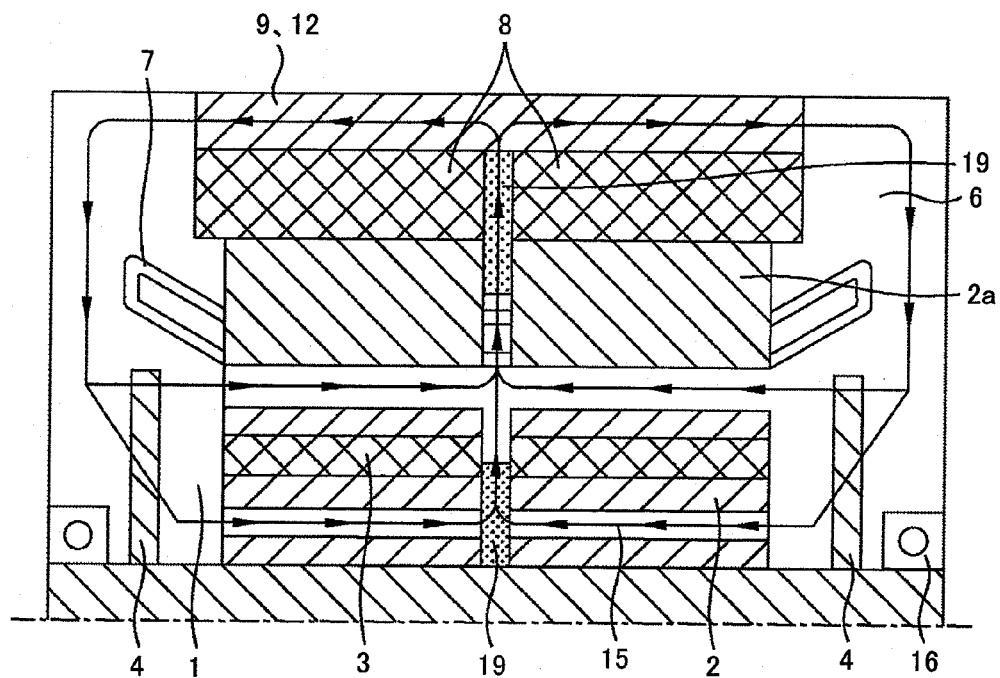
FIG. 10 is an axial cross sectional view showing a permanent magnet power generator that is a third embodiment of the permanent magnet rotating electric machine according to the present invention. (Third embodiment)

FIG. 10 shows a permanent magnet power generator that is a third embodiment of the present invention.

In the permanent magnet power generator shown in the drawing, the rotor 1 is formed of the rotor iron core 2, in which the permanent magnets 3 are embedded, and the rotor iron core 2 and two axial fans 4 are fixed at both ends of the shaft 5. A plurality of ducts 15 for ventilation in the axial direction is formed in the rotor iron core 2 in the circumferential direction at equal intervals. Furthermore, duct pieces 19 for ventilation cooling are provided in a radial pattern in radial directions at the center of the axial direction of the rotor iron core 2, at equal intervals in the circumferential direction therebetween. Radial ventilation paths are formed in the circumferential direction among the duct pieces 19.

In the stator 6, stator iron cores 2a are stacked in the axial direction and the stator coil 7 is provided. As with the rotor 1, the stator 6 has duct pieces 19 for ventilation cooling, which are disposed in a radial pattern in radial directions at the center of the axial direction of the stator iron cores 2a, at predetermined intervals in the circumferential direction. Radial ventilation paths are formed in the circumferential direction among the duct pieces 19. The water-cooling unit 8 is disposed so as to come in contact with the outer circumference of the stator 6 and to be divided into two parts along the duct pieces 19 disposed at the center of the axial direction. Furthermore, ribs 9 for ventilation cooling are provided in the circumferential direction around the outer circumference of the water-cooling unit 8, at equal intervals. The power generator frame 10 is fixed around the outer circumference of the ribs 9 to seal the interior of the power generator.

In this structure, not only the same effect as in the embodiments described above can be obtained, but also the axial fans 4 disposed at both ends of the shaft 5 enable the cooling air led between the rotor iron core 2 and stator iron cores 2a and led into the axial ducts 15 to form a plurality of flows circulating in both directions in the power generator through the radial ventilation paths formed in the duct pieces 19. Therefore, a temperature lowering effect by ventilation cooling can be expected. In addition, since the temperature in the power generator is maximized near the center of the axial direction, when cooling air flows near the center of the axial direction, the maximum temperature can be reduced and the temperature distribution in the power generator can be equalized.

Although the duct pieces 19 are disposed at the center of the axial direction in this embodiment, if an asymmetric structure in which the duct pieces 19 are displaced according to the place at which the temperature is maximized, the maximum temperature can be more efficiently lowered. The duct pieces 19 may also be disposed in a radial pattern in radial directions, at predetermined intervals in the axial direction.

Fourth Embodiment

Figure 11:
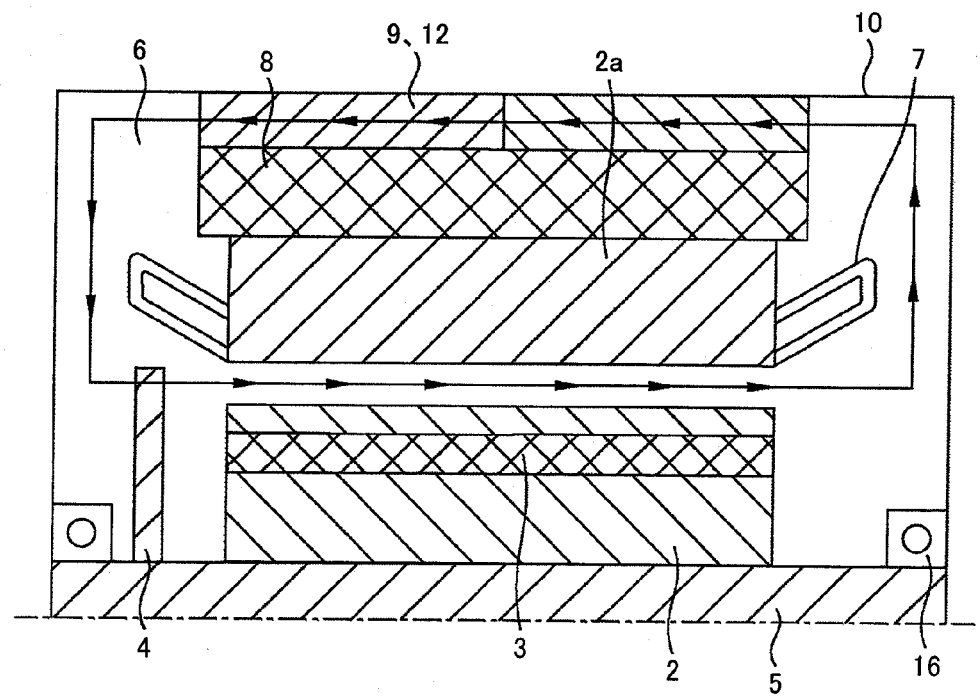
FIG. 11 is an axial cross sectional view showing a permanent magnet power generator that is a fourth embodiment of the permanent magnet rotating electric machine according to the present invention. (Fourth embodiment)
Figure 12:
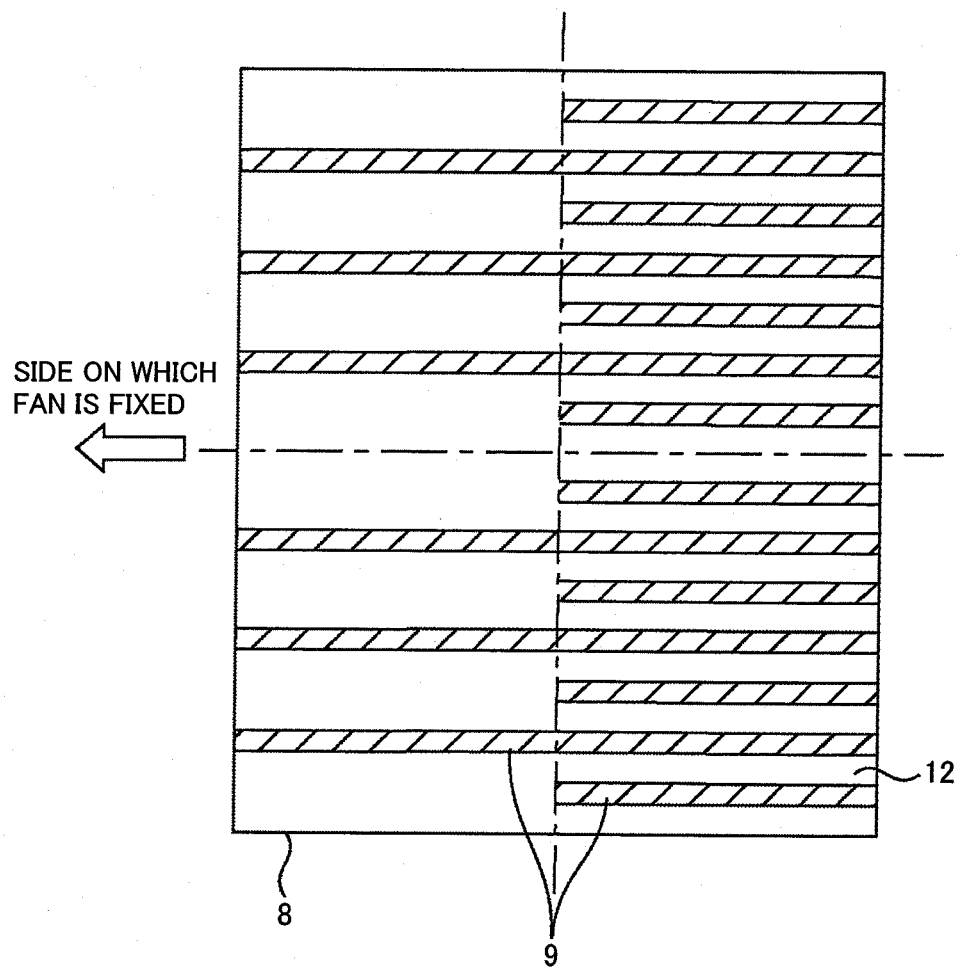
FIG. 12 is a plan view of the outer circumference of a water-cooling unit. (Fourth embodiment)

FIGS. 11 and 12 show a permanent magnet power generator that is a fourth embodiment of the present invention.

In the fourth embodiment, a different number of ribs 9, which are disposed around the outer circumference of the water-cooling unit 8 in the first embodiment, are provided on each of the right and left sides of the center of the axial direction. That is, as shown in FIG. 12, the number of ribs 9 on the side on which the axial fan 4 is fixed is smaller than the number of ribs 9 on the opposite side.

In this structure, not only the same effect as in the embodiments described above can be obtained, but also the number of ribs 9 can be reduced. In addition, when more ribs 9 are provided on a side on which temperature is high with respect to a temperature distribution on the axial direction, the temperature distribution in the power generator can be equalized.

Although, in this embodiment, the number of ribs 9 is larger on the side opposite to the axial fan 4, it is effective to provide more ribs 9 on a side on which temperature in the temperature distribution is high.

Fifth Embodiment

Figure 13:
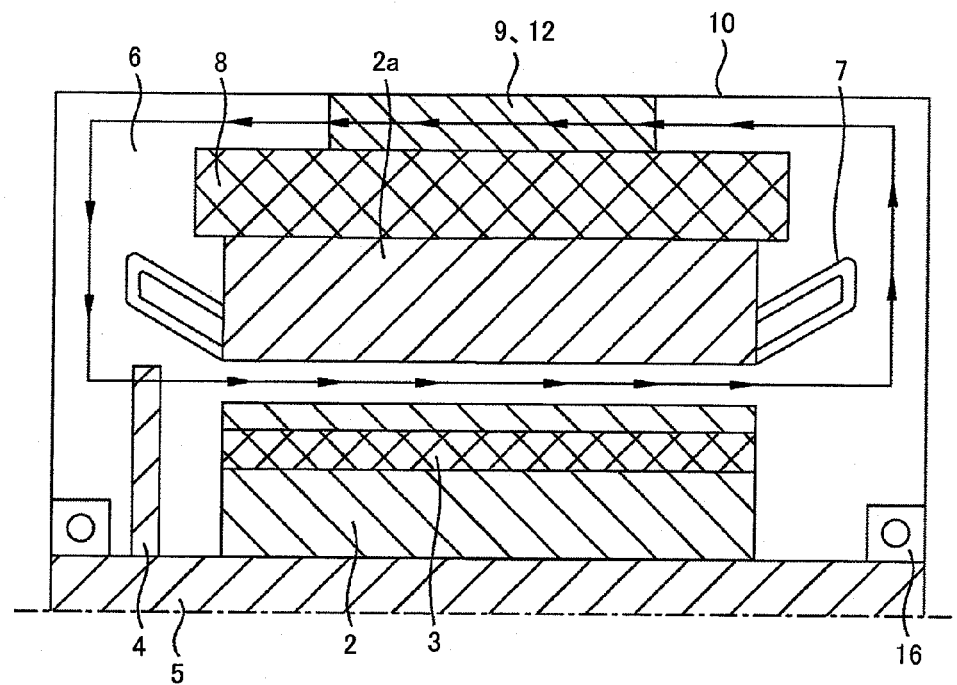
FIG. 13 is an axial cross sectional view showing a permanent magnet power generator that is a fifth embodiment of the permanent magnet rotating electric machine according to the present invention. (Fifth embodiment)

FIG. 13 shows a permanent magnet power generator that is a fifth embodiment of the present invention.

In the fifth embodiment, the ribs 9, which are disposed around the outer circumference of the water-cooling unit 8 in the first embodiment, each have a shorter axial length than the water-cooling unit 8, and the ribs 9 are disposed at the center of the axial direction.

In this structure, not only the same effect as in the embodiments described above can be obtained, but also although the temperature in the power generator tends to be maximized near the center in the axial direction, the maximum temperature can be lowered by providing the ribs 9 only near the center of the axial direction as in the fifth embodiment, and thereby the temperature distribution in the power generator can be equalized.

Sixth Embodiment

Figure 14:
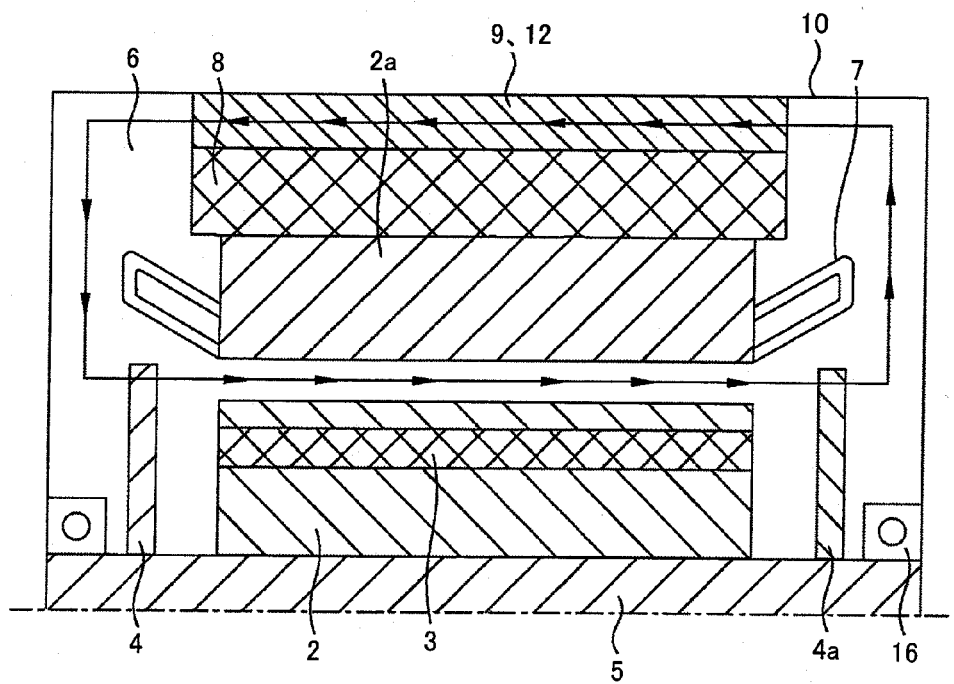
FIG. 14 is an axial cross sectional view showing a permanent magnet power generator that is a sixth embodiment of the permanent magnet rotating electric machine according to the present invention. (Sixth embodiment)

FIG. 14 shows a permanent magnet power generator that is a sixth embodiment of the present invention.

In the sixth embodiment, the axial fan 4 for flowing cooling air in the axial direction is disposed on one end of the shaft 5 as in the first embodiment, and a radial fan 4a for flowing cooling air in radial directions is provided on the opposite end of the shaft 5 with the rotor iron core 2 disposed therebetween.

This can not only provide the same effect as in the embodiments described above, but also reduce a temperature rise, because since the axial fan 4 causes cooling air to flow in the axial direction and the radial fan 4a also causes cooling air to flow in the radial directions, the cooling air easily flows through the ventilation paths 12 formed among the ribs 9 and the amount of cooling air is increased.

Seventh Embodiment

Figure 15:
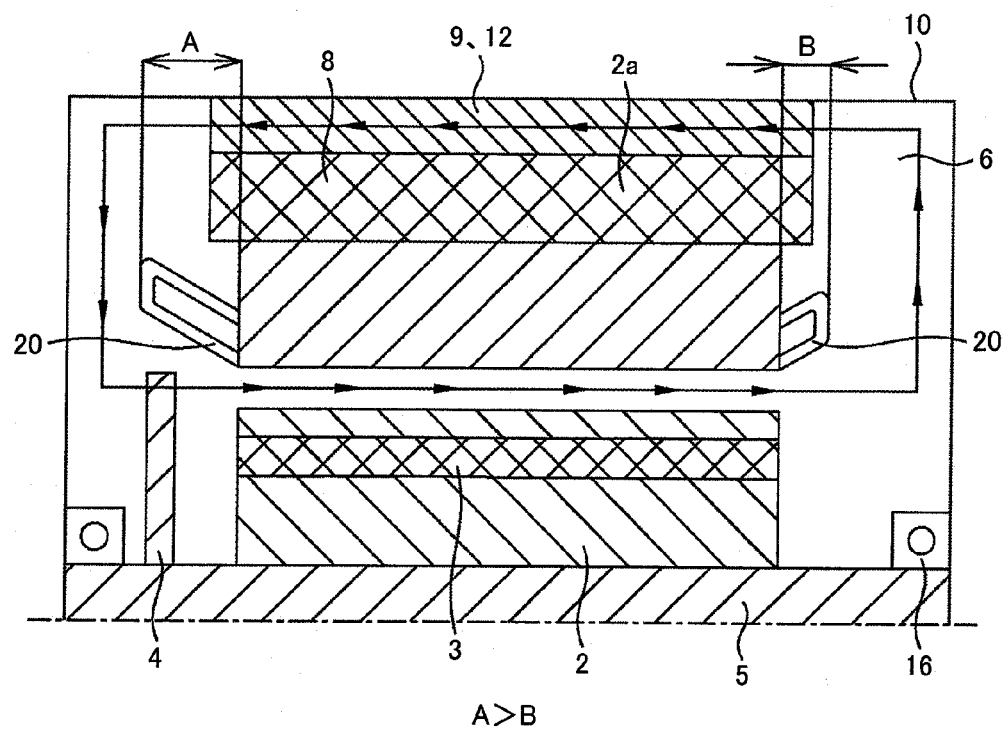
FIG. 15 is an axial cross sectional view showing a permanent magnet power generator that is a seventh embodiment of the permanent magnet rotating electric machine according to the present invention. (Seventh embodiment)

FIG. 15 shows a permanent magnet power generator that is a seventh embodiment of the present invention.

In the seventh embodiment, the lengths of the coil ends 20 on the right and left of the stator coil shown in the first embodiment are not the same. That is, as shown in FIG. 15, the axial length A of the coil end 20 on the side on which the axial fan 4 is disposed is longer than the axial length B of the coil end 20 on the side opposite to the axial fan 4.

In this structure, not only the same effect as in the embodiments described above can be obtained, but also since the axial length B of the coil end 20 on the side opposite to the axial fan 4 is shorter, ventilation resistance is reduced on the same side as the coil end 20 with a shorter axial length and air easily flows on that side. Furthermore, since the lengths of the coil ends 20 on the right and left are not the same, the maximum temperature peak in the axial direction can be shifted toward a low temperature side.

Although, in this embodiment, the coil end 20 on the side opposite to the axial fan 4 is shorter, the coil end 20 on the side on which the axial fan 4 is fixed may be shorter if the type of the fan or the like is changed.

Eighth Embodiment

Figure 16:
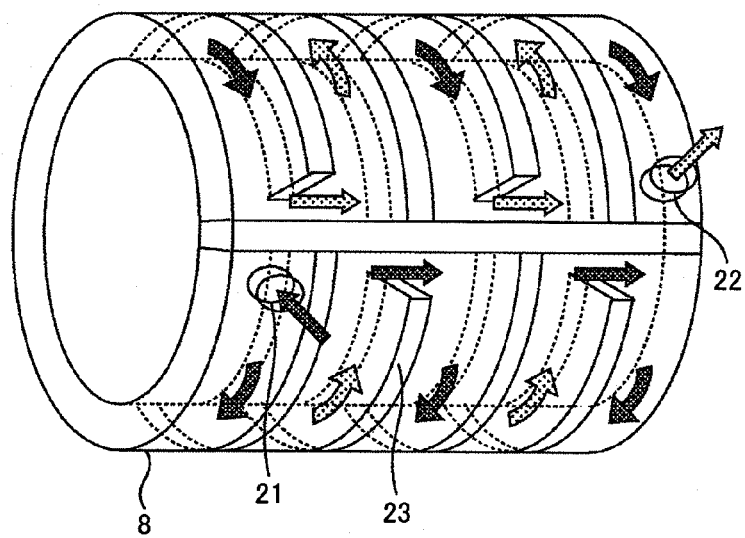
FIG. 16 shows internal flow paths, in three dimensions, in a water-cooling unit in a permanent magnet power generator that is an eighth embodiment of the permanent magnet rotating electric machine according to the present invention. (Eighth embodiment)
Figure 17:
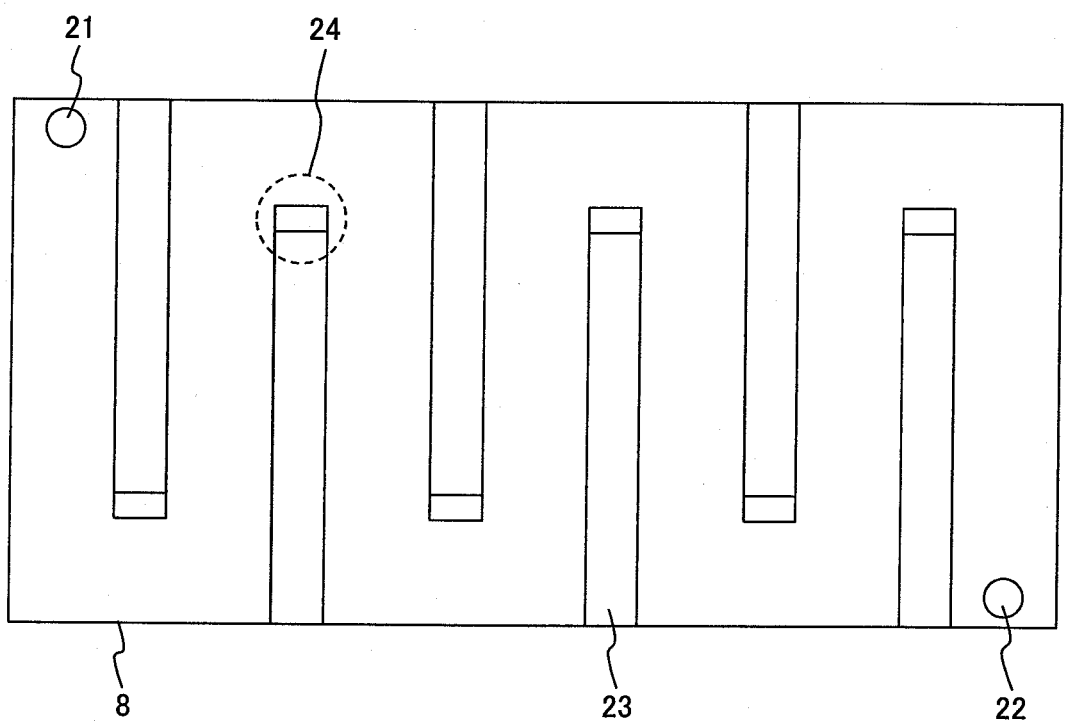
FIG. 17 shows the internal flow paths, in two dimensions, in the water-cooling unit shown in FIG. 16. (Eighth embodiment)

FIG. 16 shows internal flow paths, in three dimensions, in the water-cooling unit 8 shown in the first embodiment, as an eighth embodiment of the present invention. FIG. 17 shows the internal flow paths in two dimensions.

Figure 18:
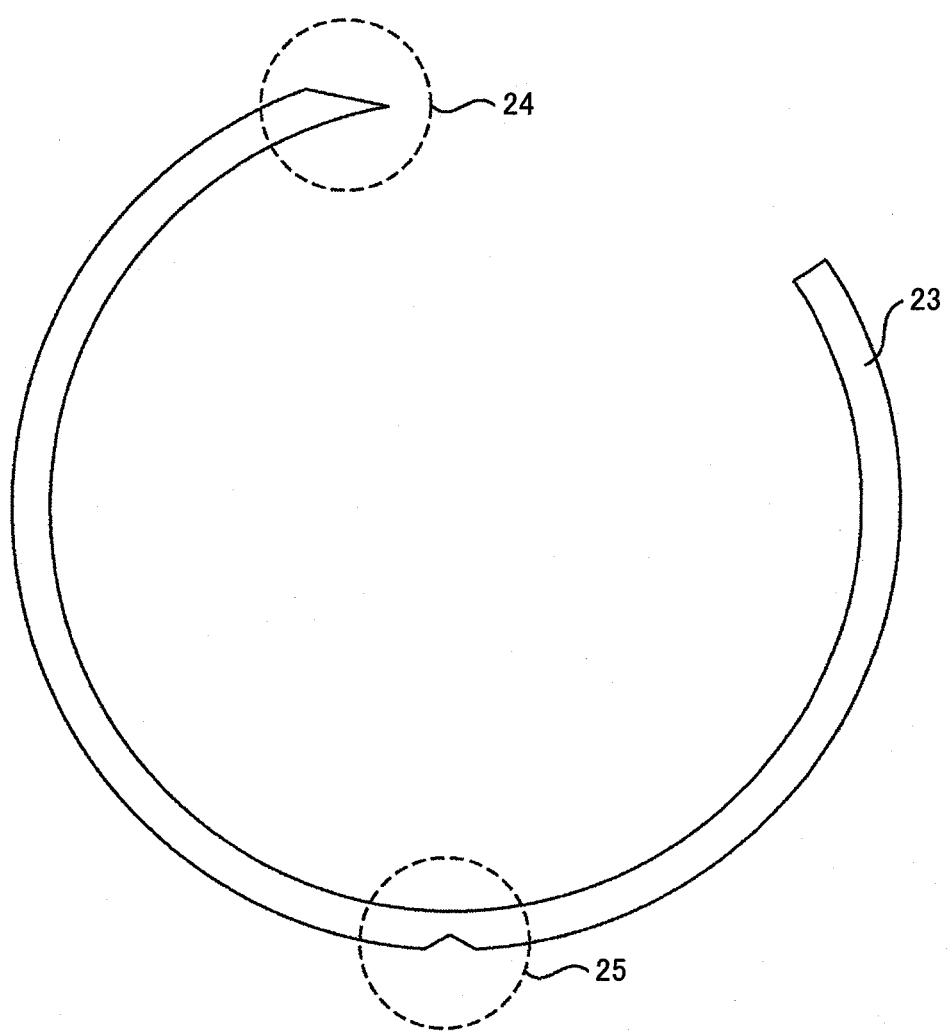
FIG. 18 is a radial cross sectional view of a flow path wall that forms one flow path in the water-cooling unit shown in FIG. 16. (Eighth embodiment)

As shown in FIG. 16, cooling water flows from an inlet 21, circulates about one turn in the water-cooling unit 8, changes its flow direction by 180 degrees, and flows again about one turn. After repeating this cycle, the cooling water flows out of an exit 22. FIG. 18 is a radial cross sectional view of a flow path wall 23 that forms one flow path in the water-cooling unit 8. The fluid flows along the circumferential direction and in the axial direction while changing its flow direction by 180 degrees at intermediate points. An oblique cut 24 is formed at an end of the flow path wall 23 at a corner where the fluid changes its flow direction (makes a U-turn).

In this structure, not only the same effect as in the embodiments described above can be obtained, but also bubbles and disturbance, which are caused by a difference in flow rate between the inside and outside of the corner where the fluid changes its flow direction, can be reduced and heat transfer can be equalized. Furthermore, a notch 25 for drainage is made on the bottom (which faces the ground when the power generator is installed) of the flow path wall 23 in the drawing. Accordingly, since a drain outlet is formed on the ground side of the water-cooling unit 8, the cooling water flows through the notch 25. This prevents the cooling water from staying in the water-cooling unit 8, improving maintainability.

A pump structured with a constant-speed machine or variable-speed machine is used as a unit for supplying cooling water to the water-cooling unit 8. If a pump structured with a variable-speed machine is used, the flow rate of the cooling water to be supplied to the water-cooling unit 8 can also be made variable. Therefore, the flow rate can be adjusted according to the output of the power generator, so the power consumption of the pump and other auxiliary machines can be suppressed and the efficiency of the entire system including the power generator can be improved.

Ninth Embodiment

Figure 19:
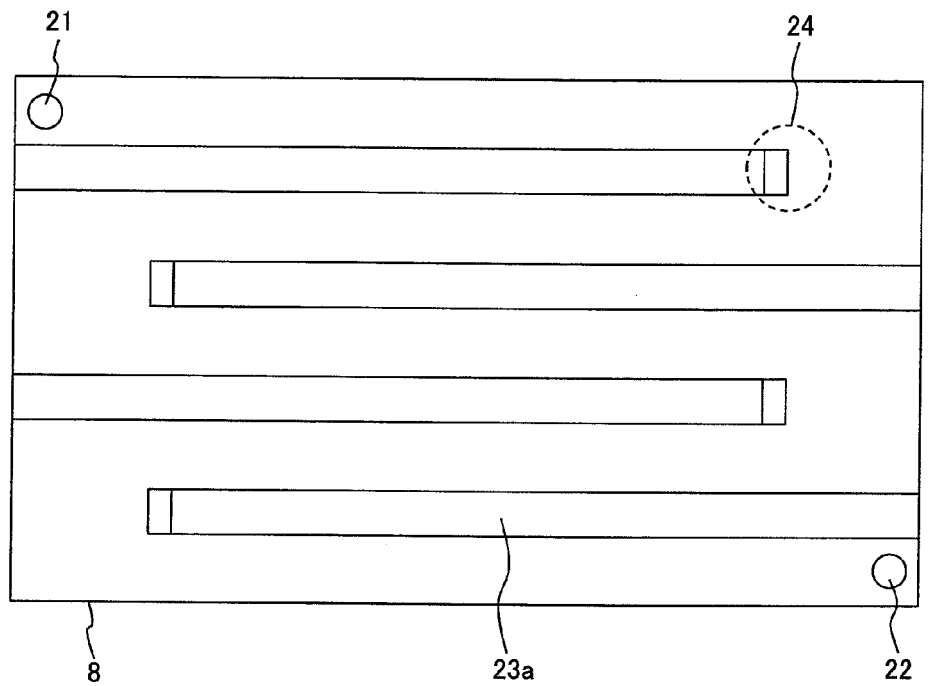
FIG. 19 shows flow paths, in two dimensions, in a water-cooling unit in a permanent magnet power generator that is a ninth embodiment of the permanent magnet rotating electric machine according to the present invention. (Ninth embodiment)

FIG. 19 shows flow paths, in two dimensions, in the water-cooling unit 8 shown in the first embodiment, as a ninth embodiment of the present invention.

In the drawing, cooling water flows from the inlet 21 into the water-cooling unit 8, proceeds to an end in the axial direction of the water-cooling unit 8, and then changes its flow direction by 180 degrees. The cooling water travels in the circumferential direction while repeating this cycle, and flows out of the exit 22.

In this structure, the cooling water flows in the axial direction while making U-turns, so the temperature distribution in the axial direction can be easily equalized. Each flow path wall 23a has a bar shape different from the flow path wall 23 shown in the eighth embodiment, so the flow path wall 23a is highly machinable. If the oblique cut 24 is formed at an end of the flow path wall 23a at a corner where the fluid changes its flow direction (makes a U-turn), the same effect as with the structure in the eighth embodiment can be obtained.

Tenth Embodiment

Figure 20:
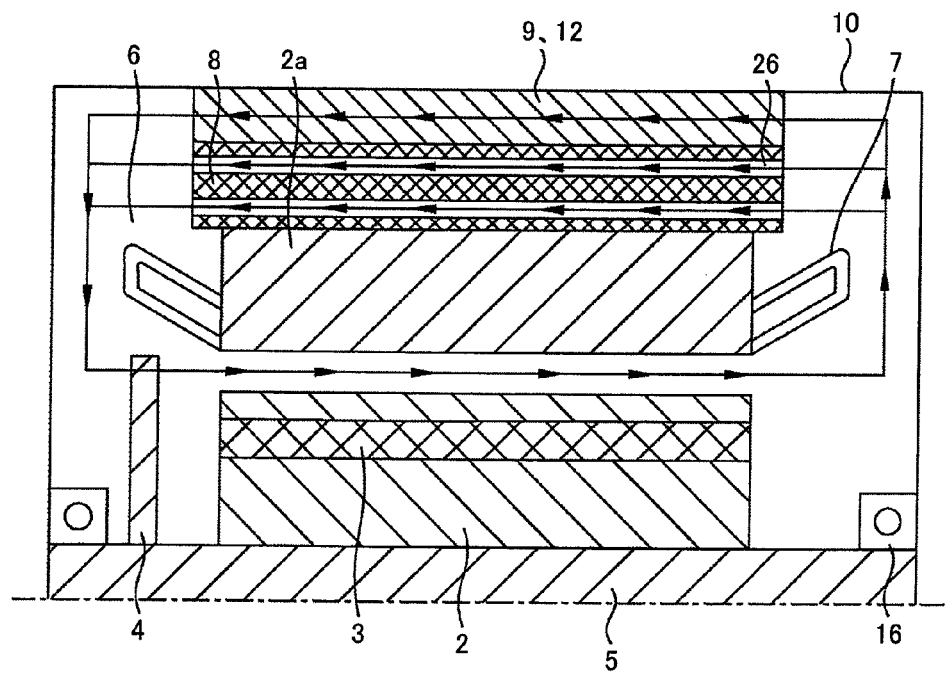
FIG. 20 is an axial cross sectional view showing a permanent magnet power generator that is a tenth embodiment of the permanent magnet rotating electric machine according to the present invention. (Tenth embodiment)

FIG. 20 shows a permanent magnet power generator that is a tenth embodiment of the present invention.

Figure 21:
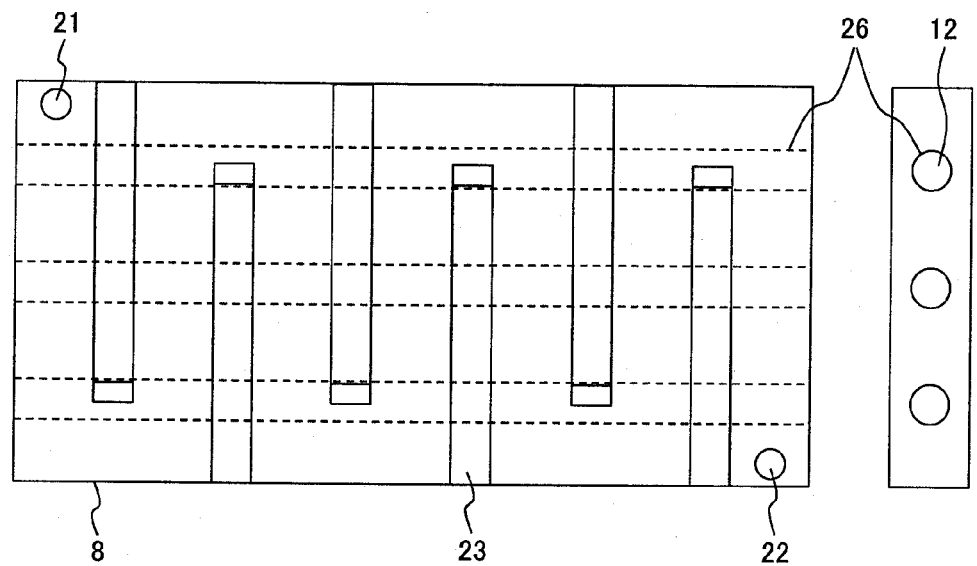
FIG. 21 is a developed view of the water-cooling unit shown in FIG. 20. (Tenth embodiment)

In the tenth embodiment, pipes 26 for ventilation cooling are provided in the water-cooling unit 8 shown in the first embodiment. FIG. 21 is a developed plan view of the water-cooling unit 8 with the pipes 26. As shown in the drawing, the pipes 26 for ventilation cooling are disposed so that they pass through the interior of the water-cooling unit 8 in the axial direction.

In this structure, not only the same effect as in the embodiments described above can be obtained, but also since cooling air flows through the ribs 9 and in the water-cooling unit 8, cooling efficiency is improved by water cooling and by heat exchange through the pipes 26. The structure shown in the third embodiment can also be used as the structure in the tenth embodiment.

Eleventh Embodiment

Figure 22:
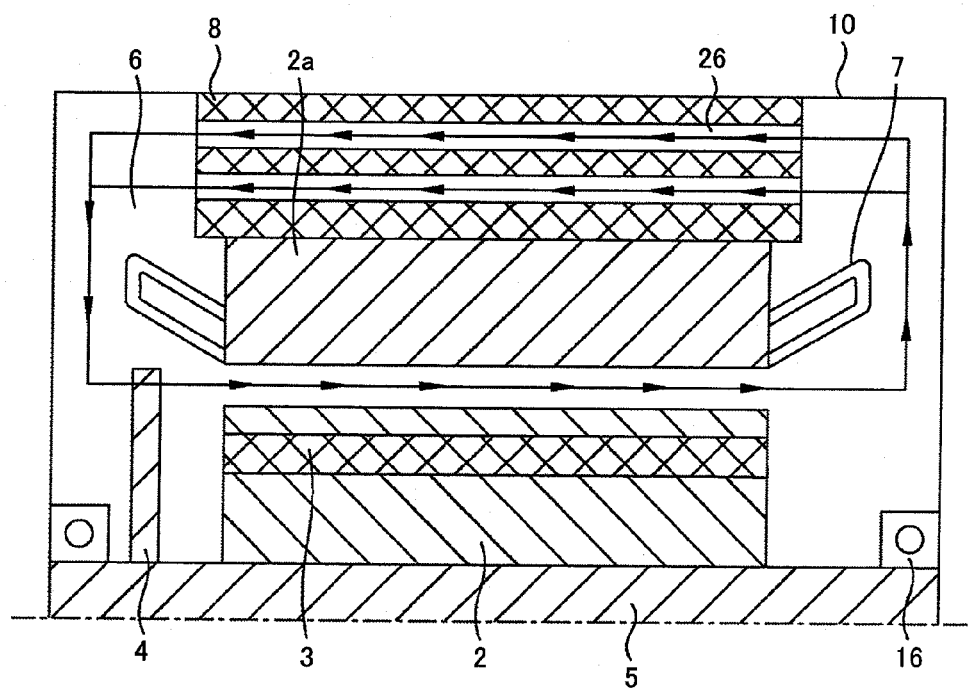
FIG. 22 is an axial cross sectional view showing a permanent magnet power generator that is an eleventh embodiment of the permanent magnet rotating electric machine according to the present invention. (Eleventh embodiment)

FIG. 22 shows a permanent magnet power generator that is an eleventh embodiment of the present invention.

The ribs 9 have been disposed around the outer circumference of the water-cooling unit 8 in the circumferential direction at equal intervals in the embodiments described so far, and the ventilation paths 12, through which cooling air flows, have been formed among the ribs 9. In the eleventh embodiment shown in FIG. 22, however, the ribs 9 may be eliminated and the pipes 26, through which cooling air directly flows, may be provided in the water-cooling unit 8.

In this structure, the cooling air that has cooled the interior of the machine and thereby has been heated is led into the pipes 26, where heat exchange with the water-cooling unit 8 is carried out to cool the heated cooling air. The cooled cooling air is circulated again in the power generator by the axial fan 4. Accordingly, the same effect as in the first embodiment described above can be obtained. Since the ribs 9 are eliminated, the number of parts can be reduced, improving the productivity.

Twelfth Embodiment

Figure 23:
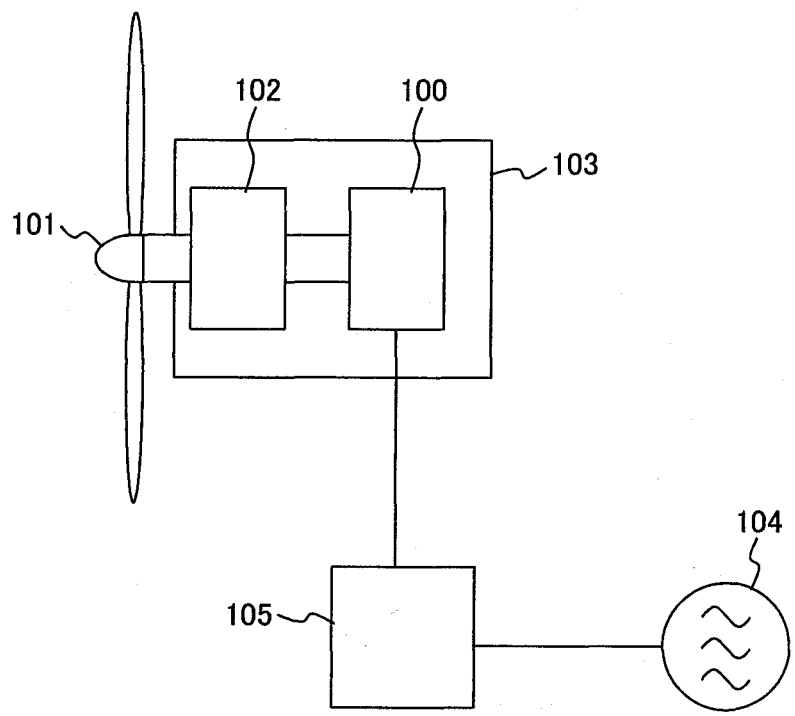
FIG. 23 shows a wind power generating system in which a permanent magnet power generator in the first to eleventh embodiments of the present invention is used. (Twelfth embodiment)

FIG. 23 illustrates an example in which the power generator according to the present invention is applied to a wind power generating system.

The power generator 100 described in the first to eleventh embodiments is connected to a windmill 101 through a speed-up gear 102 and mounted in a windmill nacelle 103. The power generator 100 is also connected to an electric power system 104 through a power converter 105 to generate electric power. It is also possible to directly interconnect the windmill 101 and power generator 100.

Although, in this embodiment, wind is used as the power source, a water mill, an engine, a turbine, or the like can be adequately applied, for example.

The power generator for wind power generation in the above embodiment is advantageous in that even if the power generator has a large capacity, it can be cooled as a compact power generator.

What is claimed is:

1. A permanent magnet rotating electric machine that has a stator with a stator coil wound on a stator iron core, a rotor with a plurality of permanent magnets disposed in a circumferential direction in a rotor iron core, which is disposed opposite to the stator iron core of the stator with a predetermined spacing therebetween and is fixed to a shaft, a water-cooling unit disposed around an outer circumference of the stator iron core, and a fan fixed to the shaft on the same side as at least one axial end of the rotor iron core to circulate cooling air in the permanent magnet rotating electric machine, wherein:

a ventilation path, through which the cooling air flows, is formed around an outer circumference of the water-cooling unit; and after the cooling air has been circulated by the fan in the machine for cooling, the cooling air is led to the ventilation path to perform heat exchange between the cooling air flowing in the ventilation path and the water-cooling unit, after which the cooling air is circulated again in the machine; and said plurality of permanent magnets being disposed in a rotor iron core, wherein a flow path wall forms an internal flow path in the water-cooling unit, in which a coolant flows in the circumferential direction; and a shape of the flow path wall at a corner where the coolant changes a flow direction thereof is such that a radial length in an outer diameter side is shorter than a radial length in an inner diameter side, the shape being oblique.

2. The permanent magnet rotating electric machine according to claim 1, wherein the flow path wall forming the internal flow path in the water-cooling unit has a notch for drainage in a direction in which the rotating electric machine faces when the rotating electric machine is installed.

* * * * *